J. T. FLETCHER.
PAIL REST.
APPLICATION FILED JUNE 22, 1912.
1,040,249.
Patented Oct. 1, 1912.
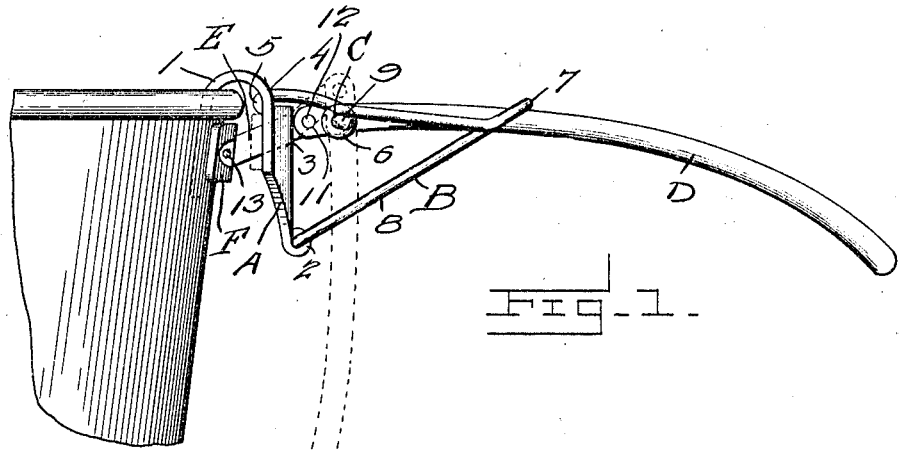
Fig. 1.
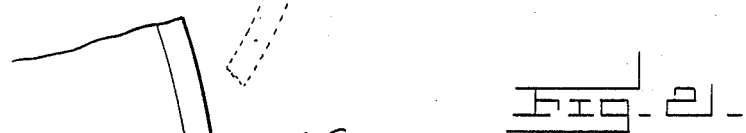
Fig. 2.
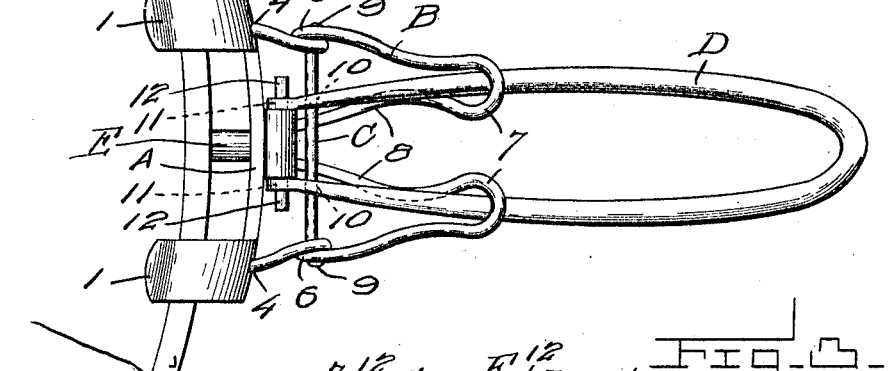
Fig. 3.
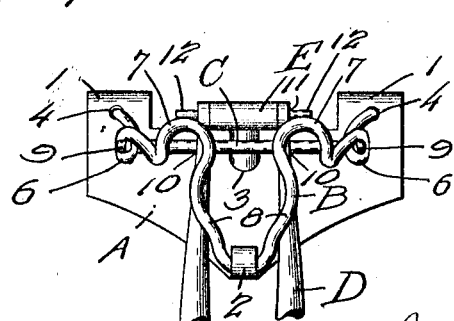
Witnesses
C. E. Richardson
A. L. Geiger
John T. Fletcher,
Inventor
by Lester L. Sargent,
Attorney

UNITED STATES PATENT OFFICE.

JOHN T. FLETCHER, OF BOSCAWEN, NEW HAMPSHIRE.

PAIL-REST.

1,040,249.   Specification of Letters Patent.   Patented Oct. 1, 1912.

Application filed June 22, 1912. Serial No. 705,306.

*To all whom it may concern:*

Be it known that I, JOHN T. FLETCHER, a citizen of the United States, residing at Boscawen, in the county of Merrimack and State of New Hampshire, have invented certain new and useful Improvements in Pail-Rests, of which the following is a specification.

The object of my invention is to provide an improved milk pail holder, like holders being attached to opposite sides of any pail and at any point on its upper edge, and which may be easily and quickly put on and taken off, and which when applied clasps the pail in such a manner as to be secure and is so locked as to provide a firm support for the pail on the knees during the operation of milking.

In the accompanying drawings, Figure 1 is a side elevation of the device attached to a pail, the dotted lines showing the device in inoperative position. Fig. 2 is a top plan. Fig. 3 is a face view of the device, in inoperative position.

Like characters of reference indicate like parts throughout the several views.

As set forth in the drawings, which are made a part of this specification and to which reference is to be had, A is a plate having spaced tongues 1 formed thereon and curved so as to depend on a plane parallel with the main portion of the plate and designed to hook over the rim of a pail as illustrated in Fig. 1. The knee rest D is formed of a large U-shaped loop of spring wire, the prongs of which are provided with oppositely-disposed perforations 10, a little distance from the ends, and with oppositely-disposed perforations 11, close to the ends of the prongs of the loop. A wire cross bar support B is provided, preferably formed from a single piece of wire of suitable size and length, having its ends attached to the plate A in some suitable manner, preferably by hooks 5 formed thereon, which catch in perforations 4 provided in plate A, and by means of a hasp 2 formed at the middle of the lower portion of plate A, which clasps the point of the V-shaped loop 8 of the cross bar support B. The cross bar support B, starting from the hooks formed at its ends, extends outwardly at right angles to the main portion of plate A for a suitable distance, where oppositely-positioned eyes 6 are provided, formed preferably by coils formed in the wire. A little distance from the eyes 6, offset loops 7 are formed by bending the wire upwardly a suitable distance to form the loops. The loops 7 terminate in the expanded arms of the V-shaped loop 8, which is bent downwardly at a suitable angle, so that its point may be attached to hasp 2 on plate A, as illustrated in the drawings.

A cross bar C, preferably of wire is suitably supported by the cross bar support B, preferably in the manner illustrated, the cross bar C having its hooked ends 9 clasped in the eyes 6 formed by the coils provided in the wire cross bar support. The cross bar C extends through perforations 10 in the knee rest D and acts as a fulcrum for that device. In the perforations 11 in the knee rest D are clasped the laterally-extending arms 12 of a T-shaped connecting piece E, the main post of which extends through an orifice 3 provided near the middle portion of plate A. At the foot of the main post of the T-shaped connecting piece E, a curved plate F is affixed in some suitable manner, preferably by means of a pin 13, as illustrated in the drawings.

In use, plate A having the curved tongues 1 is placed or hooked over the rim of the pail, the knee rest D being disposed in a dependent position, as illustrated in Fig. 1 in dotted lines. It will be observed that in this position the curved plate F is drawn back close against the main or outer portion of the hooked plate A. The function of the curved plate F is to press against the outer side of the pail, in opposition to the tongues 1 of plate A, which lap over the inner side, when plate A is fitted over the edge of the pail.

As the knee rest D is swung from its inoperative or dependent to its horizontal position for use, it acts as a lever having its fulcrum on the cross bar support B, and through the medium of the T-shaped connecting piece E, to the arms 12 of which the ends of the knee rest are attached, presses the curved plate F against the side of the pail, which is thus gripped securely by the tongues 1 of plate 8 and curved plate F.

A locking mechanism for the knee rest D is provided by the offset loops 7, in connection with the main V-shaped loop 8 formed by the wire cross bar support B. The prongs of the knee rest are gradually distended as it is being swung toward a horizontal position, until it reaches the offset loops 7, which permit its prongs to snap together in the loops 7, thus locking the mechanism in its operative position.

It will be noted that two holders are required for each pail, positioned on opposite sides of the pail, and that they may be applied without difficulty at any point around the upper edge of the pail.

I claim:

1. The combination of a plate so shaped as to hook over the edge of a pail, a knee rest, knee-rest supporting mechanism attached to the hooked plate and providing a fulcrum for the knee rest, a curved plate positioned within the hooked plate, and connective mechanism engaging the curved plate and the knee rest.

2. A device of the character described, in which are combined a plate having curved tongues, a cross bar, cross bar support affixed to the plate, a knee rest fulcrumed on the cross bar, a curved plate positioned within the plate having curved tongues, a connecting piece engaging the ends of the knee rest, and means for attaching the connecting piece to the curved plate.

3. In a device of the character described, the combination of a plate so shaped as to hook over the edge of a pail, a wire cross bar support having offset loops and a centrally-positioned V-shaped loop formed therein attached to the hooked plate, a cross bar affixed to the cross bar support, a looped knee rest fulcrumed on the cross bar and so shaped as to spring into locked engagement with the offset loops when raised to a horizontal position, a curved plate positioned within the hooked plate, and a T-shaped connecting piece joining the curved plate and the ends of the looped knee rest, substantially as described.

In testimony whereof I affix my signature in presence of two witnesses.

JOHN T. FLETCHER.

Witnesses:
CARL A. HALL,
J. W. TUCKER.

---

Copies of this patent may be obtained for five cents each, by addressing the "Commissioner of Patents. Washington, D. C."